United States Patent
Kubo

(10) Patent No.: US 11,040,577 B2
(45) Date of Patent: Jun. 22, 2021

(54) PNEUMATIC TIRE

(71) Applicant: Toyo Tire Corporation, Itami (JP)

(72) Inventor: Naoya Kubo, Itami (JP)

(73) Assignee: TOYO TIRE CORPORATION, Itami (JP)

(*) Notice: Subject to any disclaimer, the term of this patent is extended or adjusted under 35 U.S.C. 154(b) by 119 days.

(21) Appl. No.: 16/424,936

(22) Filed: May 29, 2019

(65) Prior Publication Data

US 2019/0375246 A1    Dec. 12, 2019

(30) Foreign Application Priority Data

Jun. 6, 2018  (JP) .............................. JP2018-108548

(51) Int. Cl.
| | | |
|---|---|---|
| B60C 11/03 | (2006.01) | |
| B60C 11/12 | (2006.01) | |
| B60C 11/01 | (2006.01) | |

(52) U.S. Cl.
CPC .......... B60C 11/1281 (2013.01); B60C 11/01 (2013.01); B60C 11/0304 (2013.01); B60C 11/1204 (2013.01); B60C 2011/013 (2013.01); B60C 2011/0341 (2013.01); B60C 2011/1227 (2013.01)

(58) Field of Classification Search
CPC . B60C 11/01; B60C 11/1281; B60C 11/0304; B60C 2011/0341
See application file for complete search history.

(56) References Cited

U.S. PATENT DOCUMENTS

| | | | |
|---|---|---|---|
| 2017/0106703 A1* | 4/2017 | Kubo | B60C 11/1236 |
| 2019/0001753 A1* | 1/2019 | Hayashi | B60C 11/04 |
| 2020/0376895 A1* | 12/2020 | Hamanaka | B60C 11/124 |

FOREIGN PATENT DOCUMENTS

| | | | |
|---|---|---|---|
| CN | 205553805 U | | 9/2016 |
| JP | 2015047977 A | * | 3/2015 |
| WO | 2016/128085 A1 | | 8/2016 |
| WO | 2017/122433 A1 | | 7/2017 |

OTHER PUBLICATIONS

Office Action dated Feb. 2, 2021 issued in counterpart CN application No. 201910428168.5 with English translation. (17 pages).

* cited by examiner

Primary Examiner — Steven D Maki
Assistant Examiner — Cedrick S Williams
(74) Attorney, Agent, or Firm — Westerman, Hattori, Daniels & Adrian, LLP

(57) ABSTRACT

In a pneumatic tire, a pair of width-oriented sipes that straddle one of circumferential recessed regions are arranged in such fashion as to appear to partially mutually overlap as viewed in a tire width direction, each of the pair of width-oriented sipes comprises a sipe portion at which width is constant, and a notch portion at which width increases toward the exterior in a tire radial direction, the sipe portion is such that at least one end thereof is contiguous with at least one of the circumferential recessed regions in such fashion as to be inclined with respect to the at least one circumferential recessed region; and the notch portion is arranged at a corner at which the sipe portion intersects the at least one circumferential recessed region to form an acute angle therebetween.

20 Claims, 7 Drawing Sheets

PNEUMATIC TIRE

CROSS REFERENCE TO RELATED APPLICATIONS

This application claims the benefit of priority of Japanese application no. 2018-108548, filed on Jun. 6, 2018, which is incorporated herein by reference.

BACKGROUND OF THE INVENTION

Field of the Invention

The present invention relates to a pneumatic tire.

Description of the Related Art

Conventionally a pneumatic tire might, for example, comprise a plurality of main grooves extending in the tire circumferential direction, and a pair of width-oriented sipes that straddle main grooves in the tire width direction and that appear to partially mutually overlap as viewed in the tire width direction (e.g., WO2016/128085A). As a result, because the pair of width-oriented sipes are arranged without gaps therebetween in the tire circumferential direction, traction attributable to edges of width-oriented sipes can be provided in continuous fashion.

But because width-oriented sipes are contiguous with main grooves, wear that is uneven in the tire circumferential direction relative to boundaries in the form of width-oriented sipes tends to occur. In particular, at corners where sipe portions intersect main grooves to formacute angles therebetween, because slippage and so forth tends to occur during contact with the ground, there is a tendency for said corners to wear. This being the case, wear that is uneven in the tire circumferential direction relative to boundaries in the form of width-oriented sipes (heel-and-toe wear) tends to occur.

SUMMARY OF THE INVENTION

The problem is therefore to provide a pneumatic tire that makes it possible to suppress occurrence of wear that is uneven in the tire circumferential direction relative to boundaries in the form of width-oriented sipes.

There is provided a pneumatic tire comprises:

a plurality of circumferential recessed regions extending in recessed fashion along a tire circumferential direction; and a plurality of width-oriented sipes extending in such fashion as to intersect the tire circumferential direction;

wherein a pair of the width-oriented sipes that straddle one of the circumferential recessed regions are arranged in such fashion as to appear to partially mutually overlap as viewed in a tire width direction;

wherein each of the pair of width-oriented sipes comprises a sipe portion at which width is constant, and a notch portion at which width increases toward the exterior in a tire radial direction;

wherein the sipe portion is such that at least one end thereof is contiguous with at least one of the circumferential recessed regions in such fashion as to be inclined with respect to the at least one circumferential recessed region; and wherein the notch portion is arranged at a corner at which the sipe portion intersects the at least one circumferential recessed region to form an acute angle therebetween.

Further, the pneumatic tire may have a configuration in which:

the notch portions of the pair of width-oriented sipes are respectively arranged in such fashion as to appear to partially overlap as viewed in the tire width direction.

Further, the pneumatic tire may have a configuration in which:

wherein the plurality of circumferential recessed regions include a plurality of main grooves extending in the tire circumferential direction, and at least one circumferentially oriented sipe that extends in the tire circumferential direction and that is narrower in width than the main grooves; and wherein the pair of width-oriented sipes are arranged in such fashion as to straddle one of the at least one circumferentially oriented sipe.

Further, the pneumatic tire may have a configuration in which:

the one circumferentially oriented sipe comprises a sipe portion at which width is constant, and a notch portion at which width increases toward the exterior in the tire radial direction.

Further, the pneumatic tire may have a configuration in which:

the notch portions of the pair of width-oriented sipes are respectively arranged in such fashion as to appear to be separated in the tire circumferential direction as viewed in the tire width direction.

Further, the pneumatic tire may have a configuration in which:

the plurality of circumferential recessed regions include a plurality of main grooves extending in the tire circumferential direction;

an inside end in the tire width direction of the sipe portion of one of the pair of width-oriented sipes is contiguous with one of the main grooves; and the notch portion is arranged at a corner at which the inside end intersects the one main groove to form an acute angle therebetween.

Further, the pneumatic tire may have a configuration in which:

the plurality of circumferential recessed regions include a plurality of main grooves extending in the tire circumferential direction; and an outside end in the tire width direction of one of the pair of width-oriented sipes is separated from the main grooves.

Further, the pneumatic tire may have a configuration in which:

the sipe portions of the pair of width-oriented sipes are respectively inclined so as to be directed in the same way with respect to the tire circumferential direction.

Further, the pneumatic tire may have a configuration in which:

the plurality of circumferential recessed regions include a first circumferential recessed region and a second circumferential recessed region;

the plurality of width-oriented sipes include a first width-oriented sipe, a second width-oriented sipe, and a third width-oriented sipe;

the first width-oriented sipe and the second width-oriented sipe straddle the first circumferential recessed region in the tire width direction;

the second width-oriented sipe and the third width-oriented sipe straddle the second circumferential recessed region in the tire width direction;

the first width-oriented sipe and the second width-oriented sipe are arranged in such fashion as to appear to partially mutually overlap as viewed in the tire width direction; and the second width-oriented sipe and the third width-oriented sipe are arranged in such fashion as to appear to partially mutually overlap as viewed in the tire width direction.

Further, the pneumatic tire may have a configuration in which:

the plurality of circumferential recessed regions further include a third circumferential recessed region;

the plurality of width-oriented sipes further include a fourth width-oriented sipe;

the third width-oriented sipe and the fourth width-oriented sipe straddle the third circumferential recessed region in the tire width direction; and the third width-oriented sipe and the fourth width-oriented sipe are arranged in such fashion as to appear to partially mutually overlap as viewed in the tire width direction.

DETAILED DESCRIPTION OF THE INVENTION

Below, an embodiment of a pneumatic tire is described with reference to FIG. 1 through FIG. 6. At the respective drawings (and the same is true for FIG. 7), note that dimensional ratios at the drawings and actual dimensional ratios are not necessarily consistent, and note further that dimensional ratios are not necessarily consistent from drawing to drawing.

At the respective drawings, first direction D1 is the tire width direction D1 which is parallel to the tire rotational axis which is the center of rotation of pneumatic tire (hereinafter also referred to as simply "tire") 1, second direction D2 is the tire radial direction D2 which is the direction of the diameter of tire 1, and third direction D3 is the tire circumferential direction D3 which is circumferential with respect to the rotational axis of the tire.

Note that the tire width direction D1 may be further subdivided into first side D11, which is also referred to as first width direction side D11; and second side D12, which is also referred to as second width direction side D12. Furthermore that the tire circumferential direction D3 may be further subdivided into first side D31, which is also referred to as first circumferential direction side D31; and second side D32, which is also referred to as second circumferential direction side D32.

Tire equatorial plane S1 refers to a plane that is located centrally in the tire width direction D1 of tire 1 and that is perpendicular to the rotational axis of the tire; tire meridional planes refer to planes that are perpendicular to tire equatorial plane S1 and that contain the rotational axis of the tire. Furthermore, the tire equator is the curve formed by the intersection of tire equatorial plane S1 and the outer surface (tread surface 2a, described below) in the tire radial direction D2 of tire 1.

Figure 1:
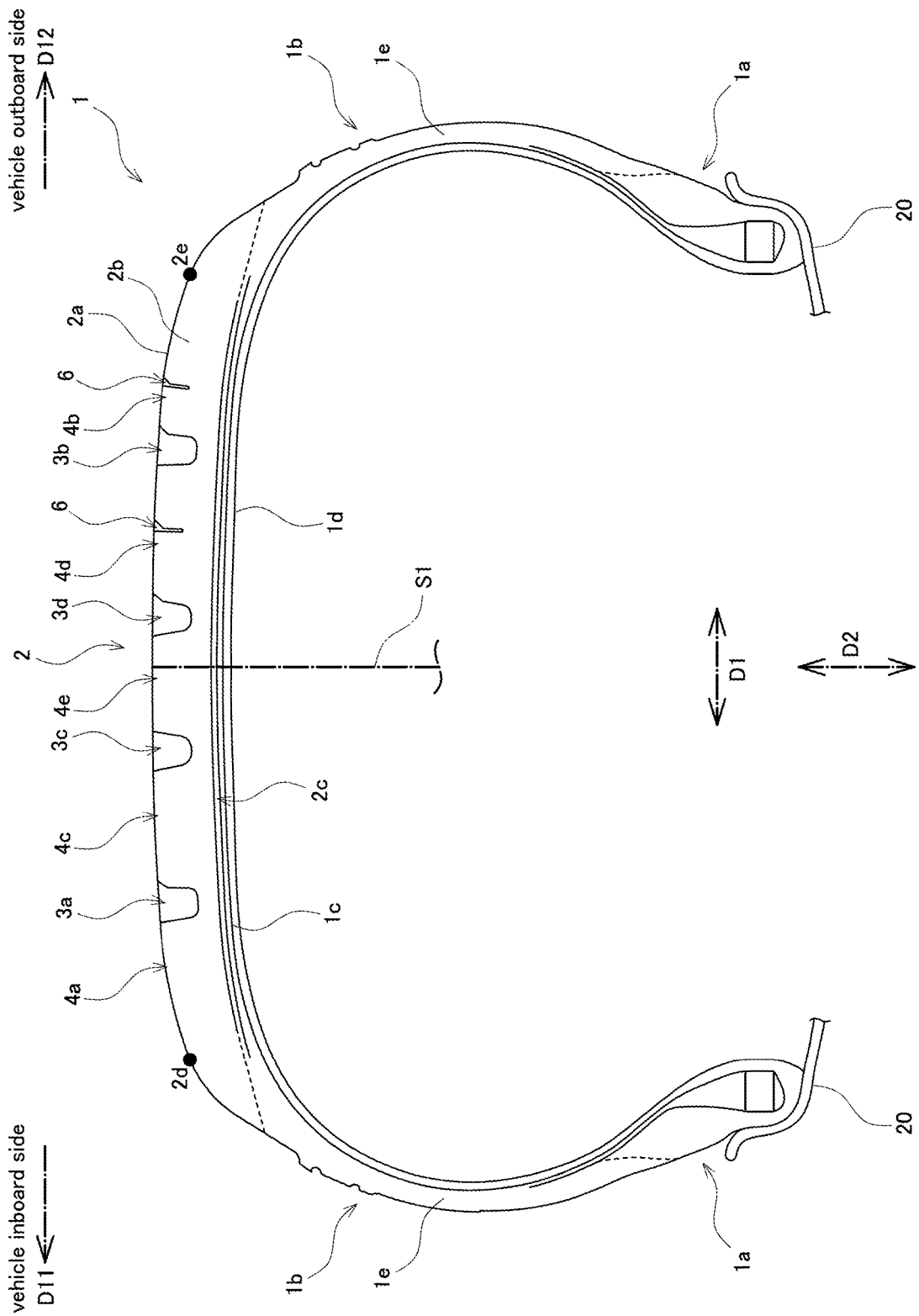
FIG. 1 is a view of a section, taken along a tire meridional plane, of the principal components in a pneumatic tire associated with an embodiment.

As shown in FIG. 1, tire 1 associated with the present embodiment is provided with a pair of bead regions 1a at which beads are present; sidewall regions 1b which extend outwardly in the tire radial direction D2 from the respective bead regions 1a; and tread region 2, the exterior surface in the tire radial direction D2 of which contacts the road surface and which is contiguous with the outer ends in the tire radial direction D2 of the pair of sidewall regions 1b. In accordance with the present embodiment, tire 1 is a pneumatic tire 1, the interior of which is capable of being filled with air, and which is capable of being mounted on a rim 20.

Furthermore, tire 1 is provided with carcass layer 1c which spans the pair of beads, and innerliner layer 1d which is arranged at a location toward the interior from carcass layer 1c and which has superior functionality in terms of its ability to impede passage of gas therethrough so as to permit air pressure to be maintained. Carcass layer 1c and inner liner layer 1d are arranged in parallel fashion with respect to the inner circumferential surface of the tire over a portion thereof that encompasses bead regions 1a, sidewall regions 1b, and tread region 2.

Tire 1 has a structure that is asymmetric with respect to tire equatorial plane S1. In accordance with the present embodiment, tire 1 is a tire for which a vehicle mounting direction is indicated, which is to say that there is an indication of whether the left or the right side of the tire 1 should be made to face the vehicle when tire 1 mounted on rim 20. Moreover, the tread pattern formed at the tread surface 2a at tread region 2 is asymmetric with respect to tire equatorial plane S1.

The orientation in which the tire is to be mounted on the vehicle is indicated at sidewall region 1b. More specifically, sidewall region 1b is provided with sidewall rubber 1e which is arranged toward the exterior in the tire width direction D1 from carcass layer 1c so as to constitute the tire exterior surface, said sidewall rubber 1e have an indicator region that indicates a vehicle mounting direction.

For example, one sidewall region 1b, i.e., that which is to be arranged toward the inboard side (hereinafter also referred to as "vehicle inboard side") of the mounted tire, is marked (e.g., with the word "INSIDE" or the like) so as to contain an indication to the effect that it is for the vehicle inboard side. While for example, the other sidewall region 1b, i.e., that which is to be arranged toward the outboard side (hereinafter also referred to as "vehicle outboard side") of the mounted tire, is marked (e.g., with the word "OUTSIDE" or the like) so as to contain an indication to the effect that it is for the vehicle outboard side. In accordance with the present embodiment, first width direction side D11 is taken to be the vehicle inboard side, and second width direction side D12 is taken to be the vehicle outboard side.

Tread region 2 is provided with tread rubber 2b having tread surface 2a which contacts the road surface, and belt layer 2c which is arranged between tread rubber 2b and carcass layer 1c. Present at tread surface 2a is the contact patch that actually comes in contact with the road surface, and the portions within said contact patch that are present at the outer ends in the tire width direction D1 are referred to as contact patch ends 2d, 2e. Note that said contact patch refers to the portion of the tread surface 2a that comes in contact with the road surface when a normal load is applied to a tire 1 mounted on a normal rim 20 when the tire 1 is inflated to normal internal pressure and is placed in vertical orientation on a flat road surface.

Normal rim 20 is that particular rim 20 which is specified for use with a particular tire 1 in the context of the body of standards that contains the standard that applies to the tire 1 in question, this being referred to, for example, as a standard rim in the case of JATMA, a "Design Rim" in the case of IRA, or a "Measuring rim" in the case of ETRTO.

Normal internal pressure is that air pressure which is specified for use with a particular tire 1 in the context of the body of standards that contains the standard that applies to the tire 1 in question, this being maximum air pressure in the case of JATMA, the maximum value listed at the table entitled "TIRE LOAD LIMITS AT VARIOUS COLD INFLATION PRESSURES" in the case of TRA, or "INFLATION PRESSURE" in the case of ETRTO, which when tire 1 is to used on a passenger vehicle is taken to be an internal pressure of 180 KPa.

Normal load is that load which is specified for use with a particular tire 1 in the context of the body of standards that contains the standard that applies to the tire 1 in question, this being maximum load capacity in the case of JATMA, the maximum value listed at the aforementioned table in the case of TRA, or "LOAD CAPACITY" in the case of ETRTO, which when tire 1 is to be used on a passenger vehicle is taken to be 85% of the load corresponding to an internal pressure of 180 KPa.

Figure 2:
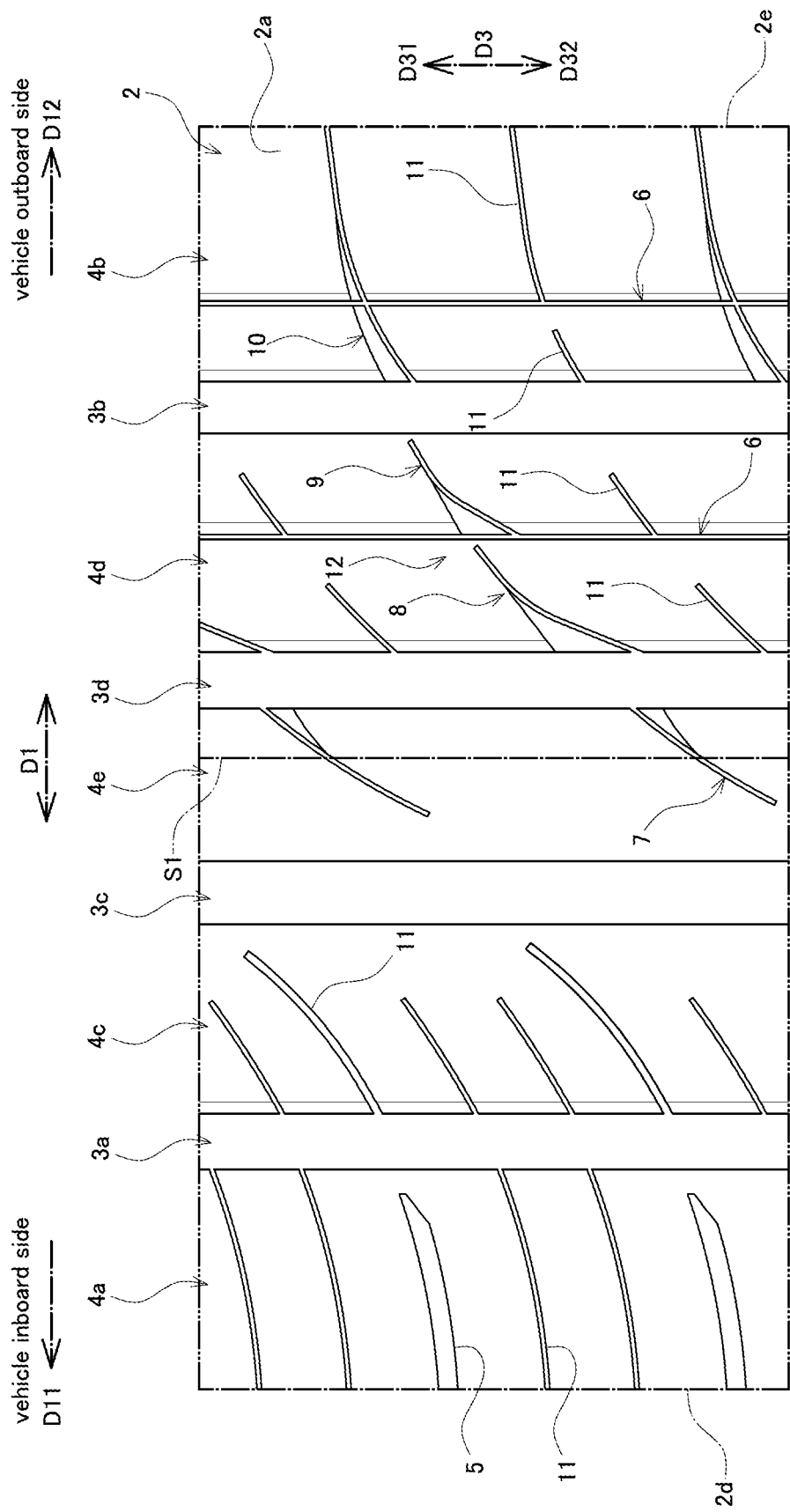
FIG. 2 is a drawing showing a tread surface of the principal components in a pneumatic tire associated with same embodiment as they would exist if unwrapped so as to lie in a single plane.

As shown in FIG. 1 and FIG. 2, tread rubber 2b is provided with a plurality of main grooves 3a through 3d extending in the tire circumferential direction D3. Main groove 3a through 3d extends continuously in the tire circumferential direction D3. Note that whereas main grooves 3a through 3d extend in straight fashion in the tire circumferential direction D3 in the present embodiment, there is no limitation with respect to such constitution, it also being possible to adopt a constitution in which these are, for example, repeatedly bent such that they extend in zigzag fashion, or a constitution in which these are, for example, repeatedly curved such that they extend in wavy fashion.

Main groove 3a through 3d might, for example, be provided with so-called tread wear indicator(s) (not shown) which are portions at which depth of the groove is reduced so as to make it possible to ascertain the extent to which wear has occurred as a result of the exposure thereof that takes place in accompaniment to wear. Furthermore, main groove 3a through 3d might, for example, have a width that is not less than 3% of the distance (dimension in the tire width direction D1) between contact patch ends 2d, 2e. Furthermore, main groove 3a through 3d might, for example, have a width that is not less than 5 mm.

Furthermore, the pair of main grooves 3a, 3b arranged at outermost locations in the tire width direction D1 are referred to as shoulder main grooves 3a, 3b, and the main grooves 3c, 3d arranged between the pair of shoulder main grooves 3a, 3b are referred to as center main grooves 3c, 3d. There is no particular limitation with respect to the number of main grooves 3a through 3d, and in accordance with the present embodiment, the number of main grooves 3a through 3d that are present is four.

Tread rubber 2b is provided with a plurality of land portions 4a through 4e which are partitioned by a plurality of main grooves 3a through 3d and the pair of contact patch ends 2d, 2e. There is no particular limitation with respect to the number of land portions 4a through 4e, and in accordance with the present embodiment, the number of land portions 4a through 4e that are present is five.

The land portions 4a, 4b which are partitioned by shoulder main groove 3a, 3b and contact patch end 2d, 2e are referred to as shoulder land portions 4a, 4b, and land portions 4c through 4e which are partitioned by the pair of main grooves 3a through 3d adjacent thereto are referred to as middle land portions 4c through 4e. Note, land portions 4c, 4d which are partitioned by shoulder main groove 3a, 3b and center main groove 3c, 3d are referred to as quarter land portions (also referred to as "mediate land portions") 4c, 4d, and land portion 4e which is partitioned by the pair of center main grooves 3c, 3d is referred to as center land portion 4e.

Center land portion 4e is arranged in such fashion as to contain tire equatorial plane S1. In addition, quarter land portion 4c and shoulder land portion 4a at inboard side D11 are entirely arranged to the inboard side D11 of tire equatorial plane S1; quarter land portion 4d and shoulder land portion 4b at outboard side D12 are entirely arranged to the outboard side D12 of tire equatorial plane S1.

Land portions 4a through 4e comprise land groove (s) 5 of width greater than 2.0 mm, and sipes 6 through 11 of width (the widths of what are referred to below as "sipe portions 6a through 10a") not greater than 2.0 mm. Sipes 6 through 11 comprise circumferentially oriented sipe(s) 6 extending in the tire circumferential direction D3, and width-oriented sipes 7 through extending in such fashion as to intersect the tire circumferential direction D3.

In accordance with the present embodiment, land grooves 5 are provided at shoulder land portion 4a at inboard side D11, circumferentially oriented sipes 6 are provided at quarter land portion 4d and shoulder land portion 4b at outboard side D12, and width-oriented sipes 7 through 11 are provided at all land portions 4a through 4e. Note that land portions 4a through 4e which are provided with land grooves 5 and sipes 6 through 11 are not limited to such constitution. Furthermore, circumferential recessed regions 3a through 3d, 6 refer to recessed regions which extend in recessed fashion along the tire circumferential direction D3, and which are main grooves 3a through 3d and circumferentially oriented sipe(s) 6.

It will be noted that first through fourth width-oriented sipes 7 through 10 constitute width-oriented sipe group 12 in serial arrangement in the tire width direction D1 and the tire circumferential direction D3. First width-oriented sipe(s) 7 are provided at center land portion 4e, second width-oriented sipe(s) 8 are provided to the inboard side D11 of circumferentially oriented sipe 6 at quarter land portion 4d at outboard side D12, third width-oriented sipe(s) 9 are provided to the outboard side D12 of circumferentially oriented sipe 6 at quarter land portion 4d at outboard side D12, and fourth width-oriented sipe(s) 10 are provided at shoulder land portion 4b at outboard side D12.

The constitutions of second and third width-oriented sipes 8, 9 will now firstly be described with reference to FIG. 3 and FIG. 4.

Figure 3:
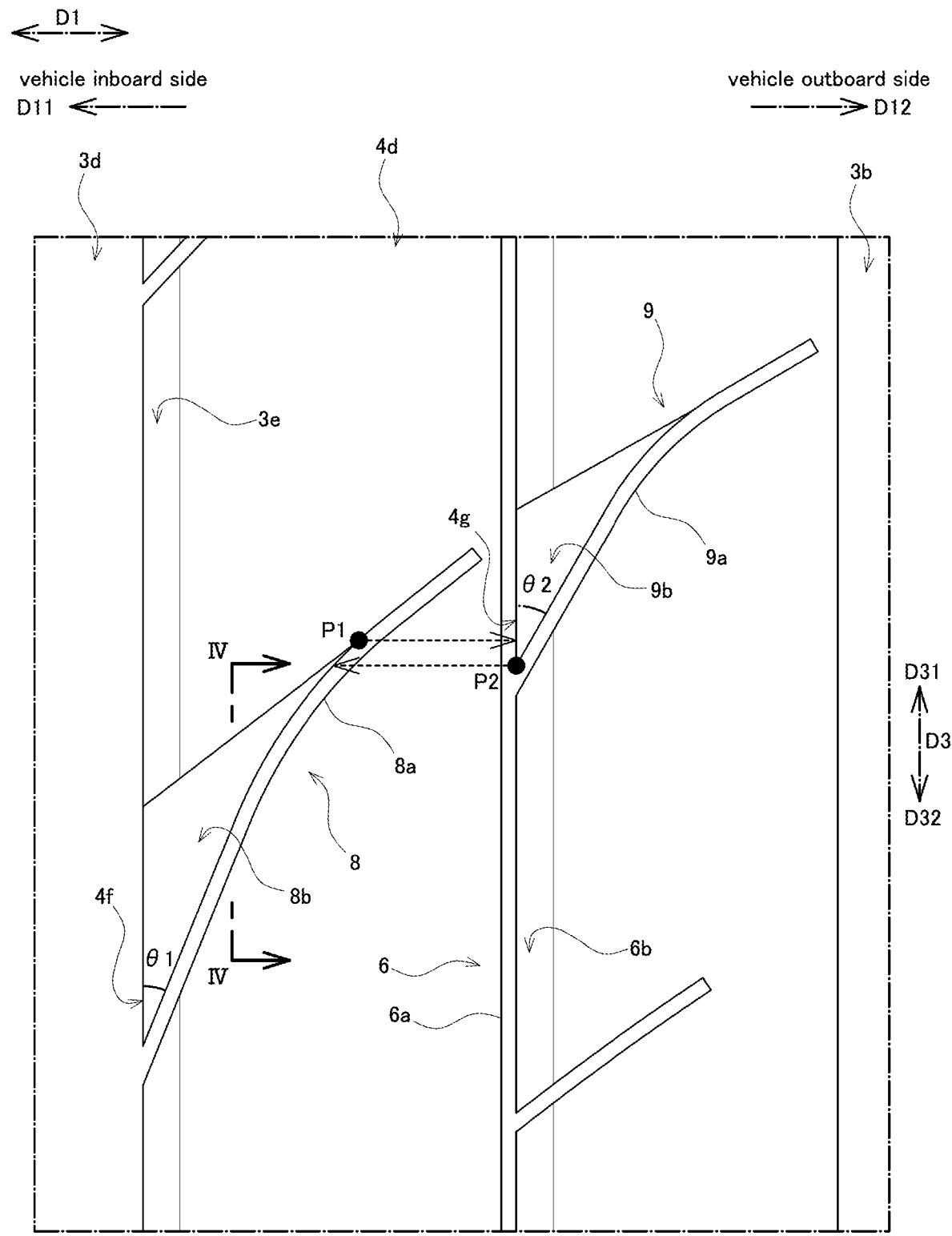
FIG. 3 is an enlarged drawing showing a tread surface of the principal components in a pneumatic tire associated with same embodiment as they would exist if unwrapped so as to lie in a single plane.
Figure 4:
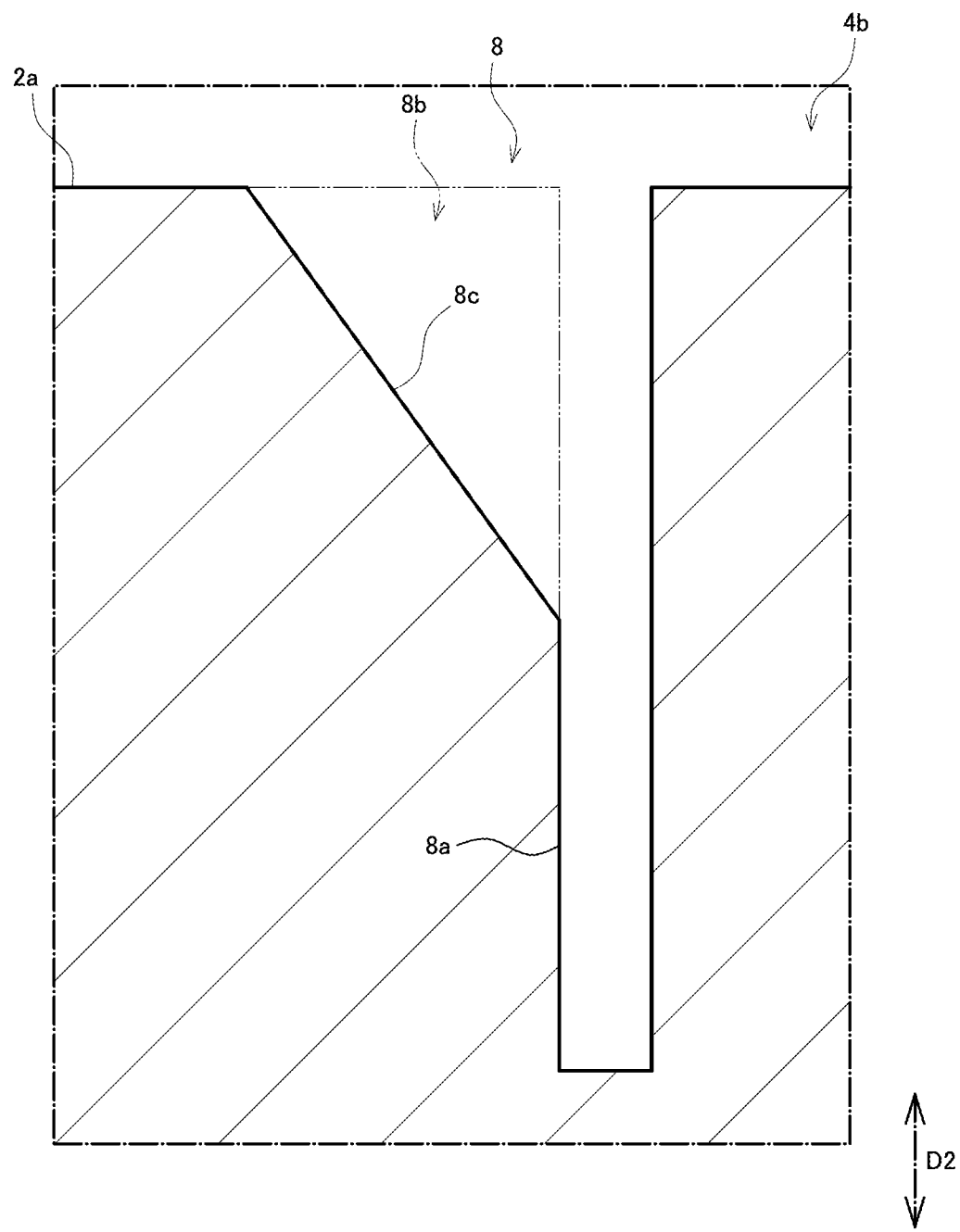
FIG. 4 is an enlarged view of a section taken along IV-IV in FIG. 3.

As shown in FIG. 3 and FIG. 4, second and third width-oriented sipes 8, 9 respectively comprises sipe portions 8a, 9a at which width is constant, and notch portions 8b, 9b at which width increases toward the exterior in the tire radial direction D2. In addition, notch portions 8b, 9b (only notch portion 8b of second width-oriented sipe 8 is shown at FIG. 4) each comprise inclined face 8c which is inclined relative to tread surface 2a.

Moreover, circumferentially oriented sipe 6 which is provided at quarter land portion 4d at outboard side D12 likewise comprises sipe portion 6a at which width is constant, and notch portion 6b at which width increases toward the exterior in the tire radial direction D2. Furthermore, center main groove 3d at outboard side D12 likewise comprises notch portion 3e at which width increases toward the exterior in the tire radial direction D2.

Sipe portions 8a, 9a of width-oriented sipes 8, 9 are inclined with respect to circumferential recessed regions 3d, 6. More specifically, sipe portions 8a, 9a of width-oriented sipes 8, 9 are inclined in such fashion as to be increasingly directed toward the first circumferential direction side D31 as one proceeds toward the outboard side D12 (i.e., they are directed toward the upper right in FIG. 3).

Accordingly, sipe portions 8a, 9a of width-oriented sipes 8, 9 are inclined so as to be directed in the same way with respect to the tire circumferential direction D3 (i.e., are directed toward the upper right in FIG. 3). Note that so long as they are inclined in such fashion as to be directed in the same way (i.e., whether directed toward upper right or upper left in FIG. 3), "inclined so as to be directed in the same way with respect to the tire circumferential direction D3" may include the situation in which the angles of inclination with respect to the tire circumferential direction D3 are different.

In addition, sipe portions 8a, 9a of width-oriented sipes 8, 9 are respectively contiguous with circumferential recessed regions 3d, 6 at the ends thereof on the inboard side D11. This being the case, quarter land portion 4d comprises corners 4f, 4g at which sipe portions 8a, 9a of width-oriented sipes 8, 9 intersect circumferential recessed regions 3d, 6 to form acute angles θ1, θ2 therebetween.

It so happens that rigidity of corners 4f, 4g which are acute angles is low. This being the case, during contact with the ground, because there is a tendency for slippage and so forth to occur at corners 4f, 4g, there will be a tendency for corners 4f, 4g to wear. Notch portions 8b, 9b of second and third width-oriented sipes 8, 9 are therefore arranged at corners 4f, 4g.

This being the case, during contact with the ground, because this will make it possible to suppress occurrence of slippage and so forth at corners 4f, 4g, this will make it possible to suppress occurrence of too much wear at corners 4f, 4g. Accordingly, at the locations of corners 4f, 4g, this will make it possible to suppress occurrence of wear (so-called "heel-and-toe wear") that is uneven in the tire circumferential direction D3 relative to boundaries in the form of width-oriented sipes 8, 9.

Furthermore, second and third width-oriented sipes 8, 9 appear to partially mutually overlap as viewed in the tire width direction D1. This being the case, because width-oriented sipes 8, 9 are arranged without gaps therebetween in the tire circumferential direction D3, traction attributable to edges of width-oriented sipes 8, 9 can be provided in continuous fashion.

Moreover, notch portions 8b, 9b of second and third width-oriented sipes 8, 9 appear to partially overlap as viewed in the tire width direction D1. More specifically, endpoint P1 at first circumferential direction side D31 of notch portion 8b of second width-oriented sipe 8 is located to the first circumferential direction side D31 of endpoint P2 at second circumferential direction side D32 of notch portion 9b of third width-oriented sipe 9. This being the case, because respective notch portions 8b, 9b are arranged without gaps therebetween in the tire circumferential direction D3, traction attributable to edges of notch portions 8b, 9b can be provided in continuous fashion.

Moreover, second and third width-oriented sipes 8, 9 are adjacent, straddling circumferentially oriented sipe 6 in the tire width direction D1. As a result, because this makes it possible to suppress occurrence of a situation in which second and third width-oriented sipes 8, 9 are separated in the tire width direction D1, traction attributable to edges of width-oriented sipes 8, 9 can be provided in continuous fashion. Thus, in accordance with various constitutions, the fact that traction attributable to edges of width-oriented sipes 8, 9 (sipe portions 8a, 9a; notch portions 8b, 9b) can be provided in continuous fashion makes it possible to improve stability in handling on dry road surfaces and on wet road surfaces.

During turns, because it so happens that contact patch length increases at the exterior in the tire width direction D1, the difference in the contact patch length at the interior versus the exterior in the tire width direction D1 of quarter land portion 4d tends to be large. Notch portion 8b of second width-oriented sipes 8 is therefore made to be contiguous with center main groove 3d at outboard side D12. Because this causes rigidity of quarter land portion 4d to be low toward the interior in the tire width direction D1, this causes the contact patch length toward the interior in the tire width direction D1 to increase.

Moreover, the outside end in the tire width direction D1 of third width-oriented sipe 9 is separated from shoulder main groove 3b at the outboard side D12. Because this causes rigidity of quarter land portion 4d to be high toward the exterior in the tire width direction D1, this causes the contact patch length toward the exterior in the tire width direction D1 to decrease. Accordingly, because this will make it possible to suppress increase in the difference in the contact patch length at the interior versus the exterior in the tire width direction D1 of quarter land portion 4d during turns, this will make it possible to improve stability in handling during turns.

Next, the constitution of first and second width-oriented sipes 7, 8 will be described with reference to FIG. 5.

Figure 5:
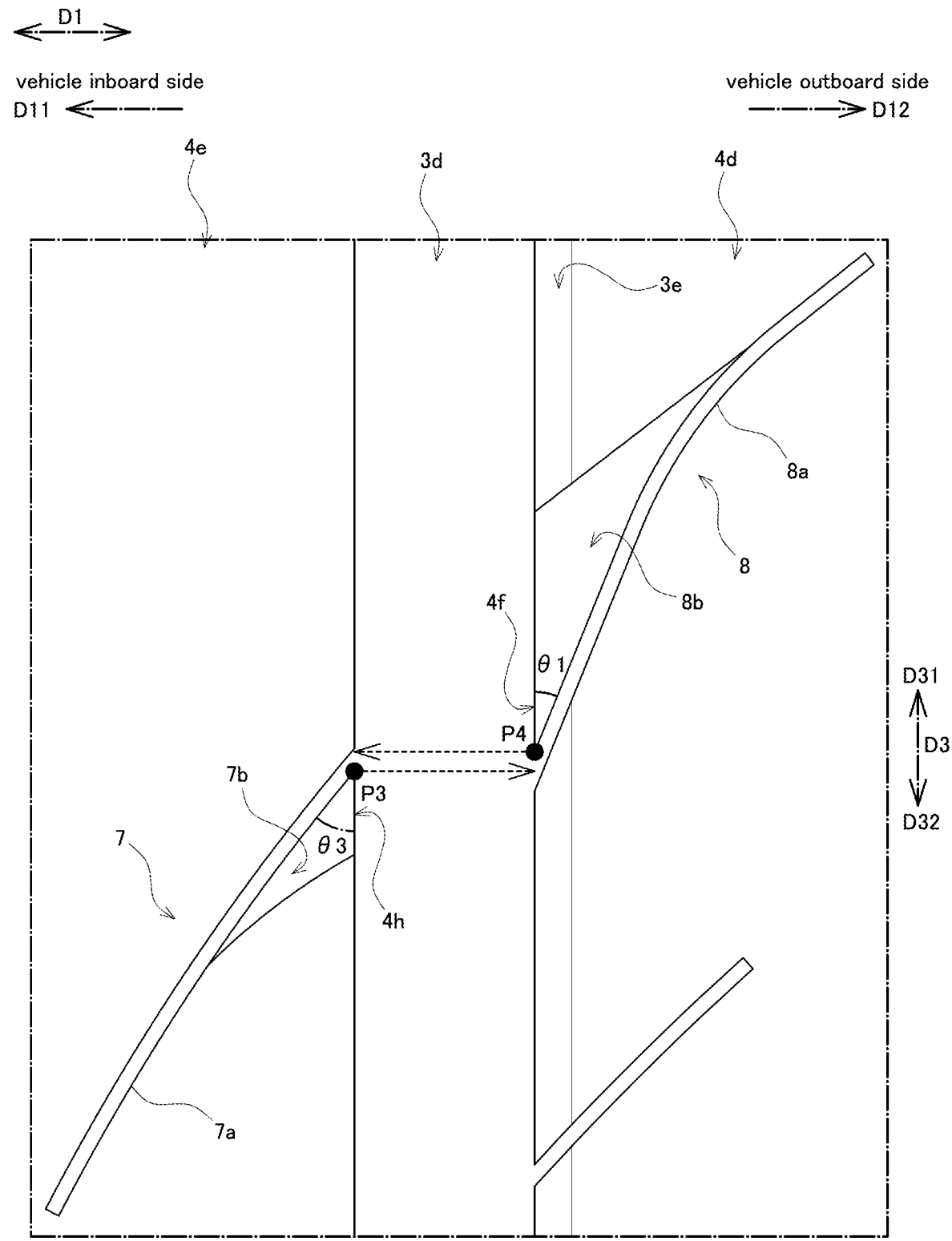
FIG. 5 is an enlarged drawing showing a tread surface of the principal components in a pneumatic tire associated with same embodiment as they would exist if unwrapped so as to lie in a single plane.

As shown in FIG. 5, first width-oriented sipe 7 comprises sipe portion 7a at which width is constant, and notch portion 7b at which width increases toward the exterior in the tire radial direction D2. Sipe portion 7a of first width-oriented sipe 7 is inclined relative to circumferential recessed region 3d. More specifically, sipe portions 7a, 8a of first and second width-oriented sipes 7, 8 are inclined so as to be directed in the same way with respect to the tire circumferential direction D3 (i.e., are directed toward the upper right in FIG. 5).

In addition, sipe portion 7a of first width-oriented sipe 7 is contiguous with circumferential recessed region 3d at the end on the outboard side D12. This being the case, center land portion 4e will comprise corner 4h at which sipe portion 7a of first width-oriented sipe 7 intersects circumferential recessed region 3d to form acute angle θ3 therebetween.

Note further that notch portion 7b of first width-oriented sipe 7 is arranged at corner 4h. Also note, as described above, that notch portion 8b of second width-oriented sipe 8 is likewise arranged at corner 4f. Because this makes it possible to suppress occurrence of slippage and so forth at corners 4f, 4h during contact with the ground, this makes it possible to suppress occurrence of too much wear at corners 4f, 4h.

Furthermore, first and second width-oriented sipes 7, 8 appear to partially mutually overlap as viewed in the tire width direction D1. This being the case, because width-oriented sipes 7, 8 are arranged without gaps therebetween in the tire circumferential direction D3, traction attributable to edges of width-oriented sipes 7, 8 can be provided in continuous fashion.

In addition, notch portions 7b, 8b of first and second width-oriented sipes 7, 8 appear to be separated in the tire circumferential direction D3 as viewed in the tire width direction D1. More specifically, endpoint P3 at first circumferential direction side D31 of notch portion 7b of first width-oriented sipe 7 is located to the second circumferential direction side D32 of endpoint P2 at second circumferential direction side D32 of notch portion 8b of second width-oriented sipe 8. As a result, although the amount of noise produced by notch portions 7b, 8b is large, because the noise produced by notch portions 7b, 8b will be intermittent, it will be possible to suppress increase in the amount of noise that is produced when driving.

Next, the constitution of third and fourth width-oriented sipes 9, 10 will be described with reference to FIG. 6.

Figure 6:
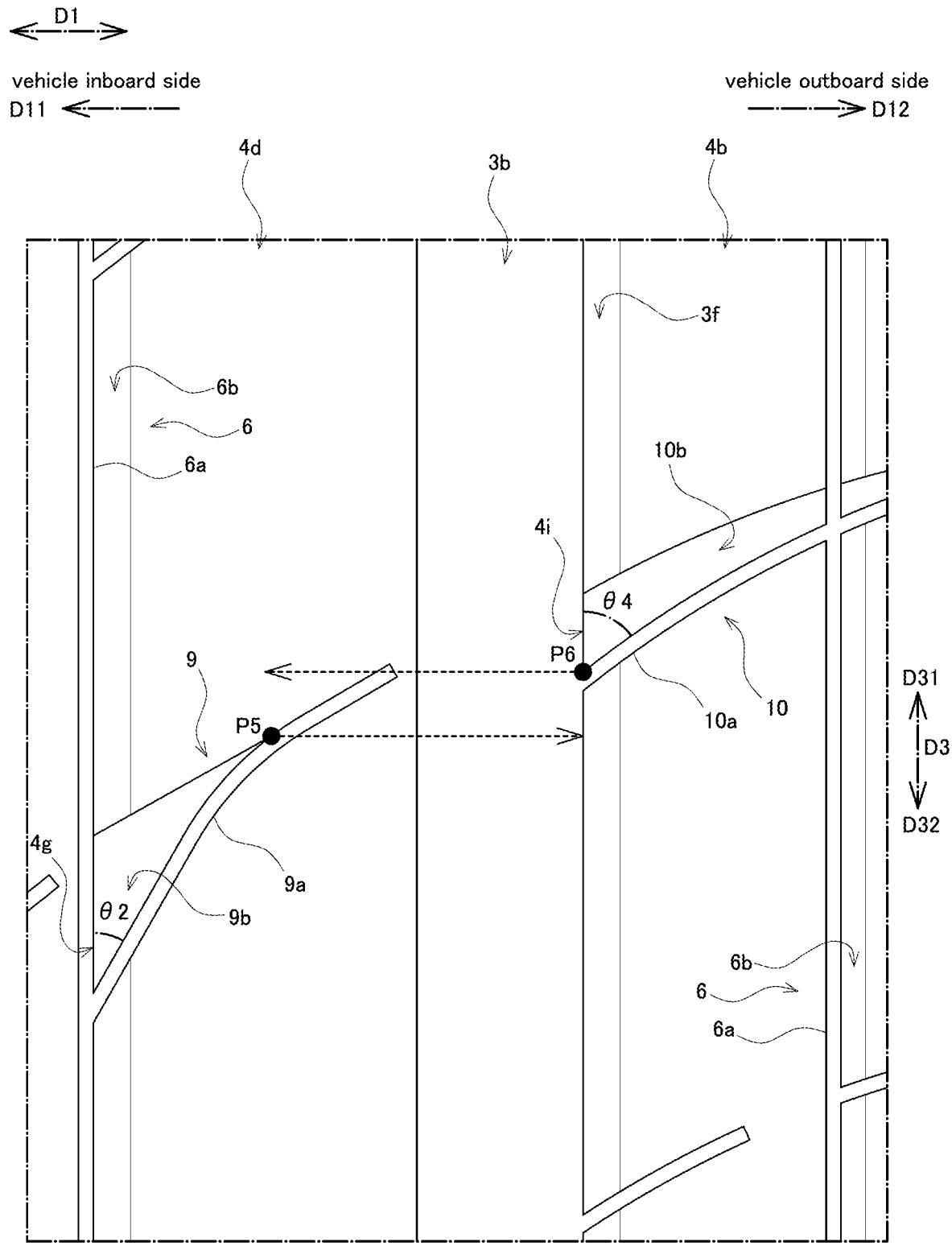
FIG. 6 is an enlarged drawing showing a tread surface of the principal components in a pneumatic tire associated with same embodiment as they would exist if unwrapped so as to lie in a single plane.

As shown in FIG. 6, fourth width-oriented sipe 10 comprises sipe portion 10a at which width is constant, and notch portion 10b at which width increases toward the exterior in the tire radial direction D2. Moreover, circumferentially oriented sipe 6 which is provided at shoulder land portion 4b at outboard side D12 likewise comprises sipe portion 6a at which width is constant, and notch portion 6b at which width increases toward the exterior in the tire radial direction D2. Furthermore, shoulder main groove 3b at outboard side D12 likewise comprises notch portion 3f at which width increases toward the exterior in the tire radial direction D2.

Sipe portion 10a of fourth width-oriented sipe 10 is inclined relative to circumferential recessed region 3b. More specifically, sipe portions 9a, 10a of third and fourth width-oriented sipes 9, 10 are inclined so as to be directed in the same way with respect to the tire circumferential direction D3 (i.e., are directed toward the upper right in FIG. 6).

In addition, sipe portion 10a of fourth width-oriented sipe 10 is contiguous with circumferential recessed region 3b at the end on the inboard side D11. This being the case, shoulder land portion 4b will comprise corner 4i at which sipe portion 10a of fourth width-oriented sipe 10 intersects circumferential recessed region 3b to form acute angle θ4 therebetween.

Note further that notch portion 10b of fourth width-oriented sipe 10 is arranged at corner 4i. Also note, as described above, that notch portion 9b of third width-oriented sipe 9 is likewise arranged at corner 4g. Because this makes it possible to suppress occurrence of slippage and so forth at corners 4g, 4i during contact with the ground, this makes it possible to suppress occurrence of too much wear at corners 4g, 4i.

Furthermore, third and fourth width-oriented sipes 9, 10 appear to partially mutually overlap as viewed in the tire width direction D1. This being the case, because width-oriented sipes 9, 10 are arranged without gaps therebetween in the tire circumferential direction D3, traction attributable to edges of width-oriented sipes 9, 10 can be provided in continuous fashion.

In addition, notch portions 9b, 10b of third and fourth width-oriented sipes 9, 10 appear to be separated in the tire circumferential direction D3 as viewed in the tire width direction D1. More specifically, endpoint P5 at first circumferential direction side D31 of notch portion 9b of third width-oriented sipe 9 is located to the second circumferential direction side D32 of endpoint P6 at second circumferential direction side D32 of notch portion 10b of fourth width-oriented sipe 10. This causes the noise produced by notch portions 9b, 10b to be intermittent.

Thus, at width-oriented sipe group 12, first and second width-oriented sipes 7, 8 appear to overlap as viewed in the tire width direction D1; second and third width-oriented sipes 8, 9 appear to overlap as viewed in the tire width direction D1; and third and fourth width-oriented sipes 9, 10 appear to overlap as viewed in the tire width direction D1. This being the case, because first through fourth width-oriented sipes 7 through 10 are arranged without gaps therebetween in the tire circumferential direction D3, traction attributable to edges of width-oriented sipes 7 through 10 can be provided in continuous fashion.

As described above, the pneumatic tire 1 of the embodiment includes: a plurality of circumferential recessed regions 3a through 3d, 6 extending in recessed fashion along a tire circumferential direction D3; and a plurality of width-oriented sipes 7 through 11 extending in such fashion as to intersect the tire circumferential direction D3; wherein a pair of the width-oriented sipes 7, 8 (8, 9; 9, 10) that straddle one 3d (6; 3b) of the circumferential recessed regions 3a through 3d, 6 are arranged in such fashion as to appear to partially mutually overlap as viewed in a tire width direction D1; wherein each of the pair of width-oriented sipes 7, 8 (8, 9; 9, 10) comprises a sipe portion 7a, 8a (8a, 9a; 9a, 10a) at which width is constant, and a notch portion 7b, 8b (8b, 9b; 9b, 10b) at which width increases toward the exterior in a tire radial direction D2; wherein the sipe portion 7a, 8a (8a, 9a; 9a, 10a) is such that at least one end thereof is contiguous with at least one 3d (3d, 6; 6, 3b) of the circumferential recessed regions 3a through 3d, 6 in such fashion as to be inclined with respect to the at least one circumferential recessed region 3d (3d, 6; 6, 3b); and wherein the notch portion 7b, 8b (8b, 9b; 9b, 10b) is arranged at a corner 4h, 4f (4f, 4g; 4g, 4i) at which the sipe portion 7a, 8a (8a, 9a; 9a, 10a) intersects the at least one circumferential recessed region 3d (3d, 6; 6, 3b) to form an acute angle θ3, θ1 (θ1, θ2; θ2, θ4) therebetween.

In accordance with such constitution, because a pair of width-oriented sipes 7, 8 (8, 9; 9, 10) appear to partially mutually overlap as viewed in the tire width direction D1, the pair of width-oriented sipes 7, 8 (8, 9; 9, 10) are arranged without gaps therebetween in the tire circumferential direction D3. As a result, traction attributable to edges of width-oriented sipes 7 through 10 can be provided in continuous fashion.

Furthermore, to address the fact that slippage at corners 4f through 4i tends to cause wear to occur during contact with the ground, notch portions 7b through 10b are arranged at corners 4f through 4i. As a result, because it will be possible to suppress occurrence of too much wear at corners 4f through 4i, it will be possible to suppress occurrence of wear (so-called "heel-and-toe wear") that is uneven in the tire circumferential direction D3 relative to boundaries in the form of width-oriented sipes 7 through 10 at the locations of corners 4f through 4i.

In the pneumatic tire 1 of the embodiment, the notch portions 8b, 9b of the pair of width-oriented sipes 8, 9 are respectively arranged in such fashion as to appear to partially overlap as viewed in the tire width direction D1.

In accordance with such constitution, because notch portions 8b, 9b at a pair of width-oriented sipes 8, 9 appear to partially overlap as viewed in the tire width direction D1, notch portions 8b, 9b are arranged without gaps therebetween in the tire circumferential direction D3. This makes it possible for traction attributable to edges of notch portions 8b, 9b to be provided in continuous fashion.

In the pneumatic tire 1 of the embodiment, wherein the plurality of circumferential recessed regions 3a through 3d, 6 include a plurality of main grooves 3a through 3d extending in the tire circumferential direction D3, and at least one circumferentially oriented sipe 6 that extends in the tire circumferential direction D3 and that is narrower in width than the main grooves 3a through 3d; and wherein the pair of width-oriented sipes 8, 9 are arranged in such fashion as to straddle one of the at least one circumferentially oriented sipe 6.

In accordance with such constitution, because a pair of width-oriented sipes 8, 9 are arranged so as to straddle circumferentially oriented sipe 6, it is possible to suppress occurrence of a situation in which the pair of width-oriented sipes 8, 9 are separated in the tire width direction D1. As a result, traction attributable to edges of the pair of width-oriented sipes 8, 9 can be provided in continuous fashion.

In the pneumatic tire 1 of the embodiment, the notch portions 7b, 8b (9b, 10b) of the pair of width-oriented sipes 7, 8 (9, 10) are respectively arranged in such fashion as to appear to be separated in the tire circumferential direction D3 as viewed in the tire width direction D1.

In accordance with such constitution, to address the fact that the amount of noise tends to be large when notch portions 7b through 10b come in contact with the ground, a pair of notch portions 7b, 8b (9b, 10b) are made to appear to be separated in the tire circumferential direction D3 as viewed in the tire width direction D1. This causes the noise produced by notch portions 7b through 10b to be intermittent.

In the pneumatic tire 1 of the embodiment, the plurality of circumferential recessed regions 3a through 3d, 6 include a plurality of main grooves 3a through 3d extending in the tire circumferential direction D3; an inside end in the tire width direction D1 of the sipe portion 8a of one 8 of the pair of width-oriented sipes 7, 8 is contiguous with one 3d of the main grooves 3a through 3d; and the notch portion 8b is arranged at a corner 4f at which the inside end intersects the one main groove 3d to form an acute angle θ1 therebetween.

In accordance with such constitution, because notch portion 8b is arranged at the inside end in the tire width direction D1 of land portion 4d, rigidity of said land portion 4d decreases toward the interior in the tire width direction D1. This causes the contact patch length toward the interior in the tire width direction D1 of said land portion 4d to increase. Accordingly, to address the fact that there is a tendency for the contact patch length at the exterior in the tire width direction D1 of land portion 4d to increase during turns, this will make it possible to suppress increase in the difference in the contact patch length at the interior versus the exterior in the tire width direction D1.

In the pneumatic tire 1 of the embodiment, the plurality of circumferential recessed regions 3a through 3d, 6 include a plurality of main grooves 3a through 3d extending in the tire circumferential direction D3; and an outside end in the tire width direction D1 of one 9 of the pair of width-oriented sipes 9, 10 is separated from the main grooves 3a through 3d.

In accordance with such constitution, because the outside end in the tire width direction D1 of width-oriented sipe 9 is separated from main groove 3b, rigidity of land portion 4d increases toward the exterior in the tire width direction D1. This causes the contact patch length toward the exterior in the tire width direction D1 of said land portion 4d to decrease. Accordingly, to address the fact that there is a tendency for the contact patch length at the exterior in the tire width direction D1 of land portion 4d to increase during turns, this will make it possible to suppress increase in the difference in the contact patch length at the interior versus the exterior in the tire width direction D1.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that sipe portions 7a through 10a of width-oriented sipes 7 through 10 are contiguous at only one end with circumferential recessed regions 3b, 3d, 6. However, pneumatic tire 1 is not limited to such constitution. For example, as shown in FIG. 7, it is also possible to adopt a constitution in which sipe portions 8a, 9a of width-oriented sipes 8, 9 are contiguous at both ends with circumferential recessed regions 3b, 3d, 6.

Figure 7:
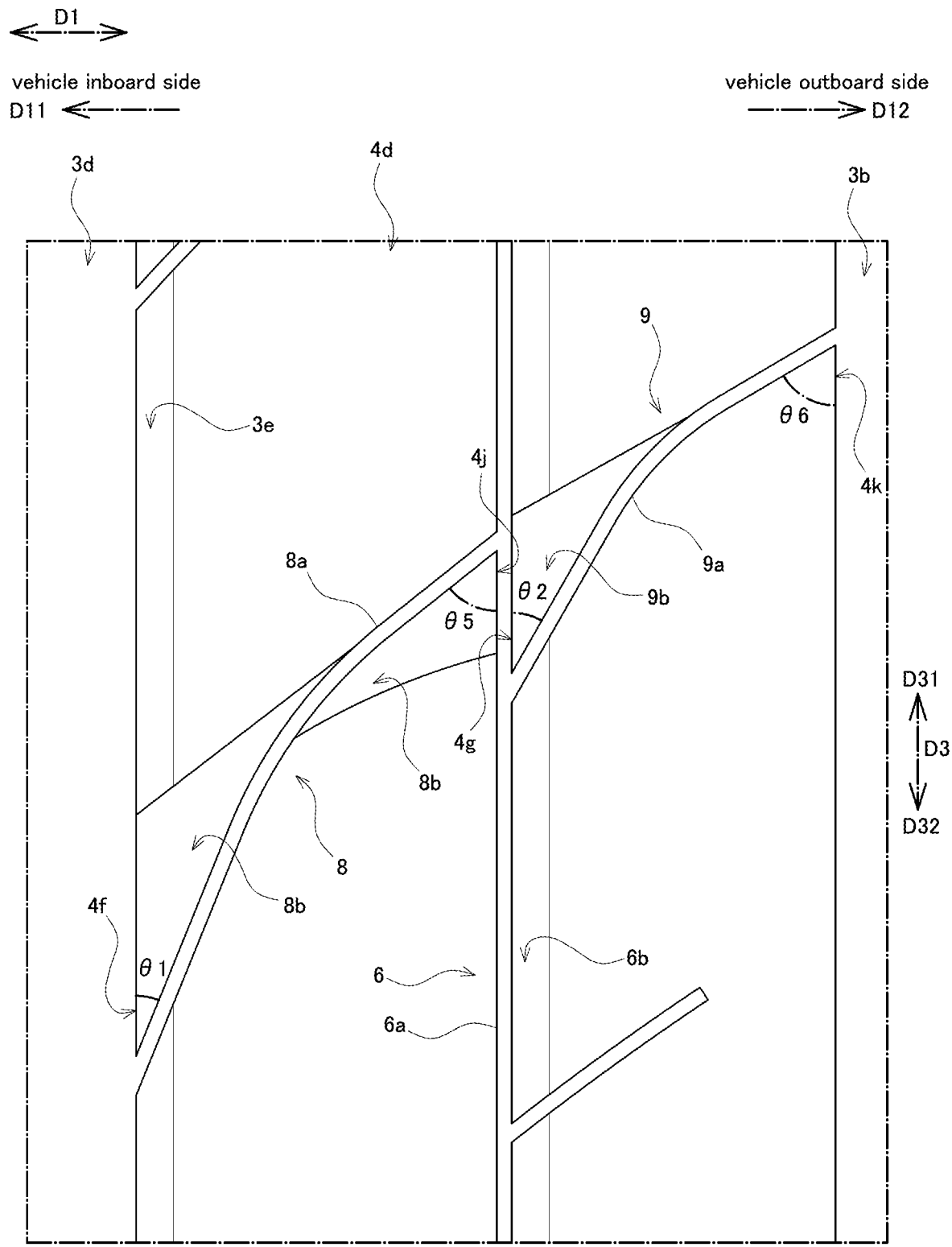
FIG. 7 is an enlarged drawing showing a tread surface of the principal components in a pneumatic tire associated with another embodiment as they would exist if unwrapped so as to lie in a single plane.

In the context of such constitution, as is the case at second width-oriented sipe 8 in FIG. 7, it is also possible to adopt a constitution in which notch portions 8b are arranged at each of two corners 4f, 4j at which sipe portion 8a intersects circumferential recessed regions 3d, 6 to form acute angles θ1, therebetween. Furthermore, as is the case at third width-oriented sipe 9 in FIG. 7, it is also possible to adopt a constitution in which notch portion 9b is arranged at only one 4g of the two corners 4g, 4k at which sipe portion 9a intersects circumferential recessed regions 6, 3b to form acute angles θ2, θ6 therebetween. In other words, it is sufficient that the constitution be such that notch portion(s) 7b through 10b are arranged at least one of corner(s) 4f through 4k at which sipe portion(s) 7a through 10a intersect circumferential recessed region(s) 3a through 3d, 6 to form acute angle(s) θ1 through θ6 therebetween.

(2) Furthermore, the constitution of pneumatic tire 1 associated with the foregoing embodiment is such that this is a tire for which a vehicle mounting direction is indicated. However, pneumatic tire 1 is not limited to such constitution. For example, it is also possible to adopt a constitution in which pneumatic tire 1 is a tire for which a vehicle mounting direction is not indicated. More specifically, the tread pattern may be a tread pattern that exhibits point symmetry about an arbitrary point on the tire equator, or may be a tread pattern that exhibits line symmetry about the tire equator.

The invention claimed is:

1. A pneumatic tire comprising:
    first and second circumferential recessed regions extending in recessed fashion along a tire circumferential direction; and
    first and second width-oriented sipes extending to intersect the tire circumferential direction,
    wherein the tire circumferential direction includes a first circumferential direction side and a second circumferential direction side which is opposite the first circumferential direction side,
    wherein the first width-oriented sipe and the second width-oriented sipe straddle the first circumferential recessed region,
    wherein the first circumferential recessed region and the second circumferential recessed region straddle the second width-oriented sipe in the tire width direction, wherein the first width-oriented sipe and the second width-oriented sipe are arranged to have a portion thereof mutually overlapping as viewed in the tire width direction, wherein an endpoint at the first circumferential direction side of the second width-oriented sipe is located on the first circumferential direction side of an endpoint at the second circumferential direction side of the first width-oriented sipe, wherein the endpoint at the first circumferential direction side of the second width-oriented sipe is located on the second circumferential direction side of an endpoint at the first circumferential direction side of the first width-oriented sipe, wherein the first width-oriented sipe comprises a first sipe portion at which width is constant, and a first notch portion at which width increases outwardly in a tire radial direction, wherein a first end of the first sipe portion is contiguous with the first circumferential recessed region, and the first sipe portion is inclined with respect to the first circumferential recessed region, wherein the first notch portion is arranged at a corner at which the first sipe portion intersects the first circumferential recessed region to form an acute angle therebetween, wherein the second width-oriented sipe comprises a second sipe portion at which width is constant, and a second notch portion at which width increases outwardly in the tire radial direction, wherein a first end of the second sipe portion is contiguous with at least one of the first and second circumferential recessed regions, and the second sipe portion is inclined with respect to the at least one of the first and second circumferential recessed regions, and wherein the second notch portion is arranged at a corner at which the second sipe portion intersects the at least one of the first and second circumferential recessed regions to form an acute angle therebetween.

2. The pneumatic tire according to claim 1,
wherein the first and second notch portions are arranged overlap as viewed in the tire width direction,
wherein an endpoint at the first circumferential direction side of the second notch portion is located on the first circumferential direction side of an endpoint at the second circumferential direction side of the first notch portion, and
wherein the endpoint at the first circumferential direction side of the second notch portion is located on the second circumferential direction side of an endpoint at the first circumferential direction side of the first notch portion.

3. The pneumatic tire according to claim 2, further comprising a plurality of main grooves extending in the tire circumferential direction, and at least one circumferentially oriented sipe that extends in the tire circumferential direction and that is narrower in width than the main grooves,
wherein the first circumferential recessed region is one of the at least one circumferentially oriented sipe.

4. The pneumatic tire according to claim 3, wherein the first circumferential recessed region comprises a circumferential sipe portion at which width is constant, and a notch portion at which width increases outwardly in the tire radial direction.

5. The pneumatic tire according to claim 3, wherein
a first end of the second width-oriented sipe is contiguous with the second circumferential recessed region, and a second end of the second width-oriented sipe is separated from the first circumferential recessed region.

6. The pneumatic tire according to claim 5, further comprising a third circumferential recessed region extending in recessed fashion along the tire circumferential direction, wherein
the first circumferential recessed region and the third circumferential recessed region straddle the first width-oriented sipe in the tire width direction, and
a second end of the first width-oriented sipe is separated from the third circumferential recessed region.

7. The pneumatic tire according to claim 6, wherein the first sipe portion and the second sipe portion are respectively inclined so as to be directed in the same way with respect to the tire circumferential direction.

8. The pneumatic tire according to claim 1, further comprising a third width-oriented sipe extending to intersect the tire circumferential direction, wherein
the second width-oriented sipe and the third width-oriented sipe straddle the second circumferential recessed region in the tire width direction,
the second width-oriented sipe and the third width-oriented sipe are arranged to have a portion thereof mutually overlapping as viewed in the tire width direction,
an endpoint at the first circumferential direction side of the third width-oriented sipe is located on the first circumferential direction side of an endpoint at the second circumferential direction side of the second width-oriented sipe, and
the endpoint at the first circumferential direction side of the third width-oriented sipe is located on the second circumferential direction side of an endpoint at first circumferential direction side of the second width-oriented sipe.

9. The pneumatic tire according to claim 8, further comprising a third circumferential recessed region extending in recessed fashion along the tire circumferential direction and a fourth width-oriented sipe extending to intersect the tire circumferential direction, wherein
the first width-oriented sipe and the fourth width-oriented sipe straddle the third circumferential recessed region in the tire width direction,
the first width-oriented sipe and the fourth width-oriented sipe are arranged to have a portion thereof mutually overlapping as viewed in the tire width direction,
the endpoint at the first circumferential direction side of the first width-oriented sipe is located on the first circumferential direction side of an endpoint at the second circumferential direction side of the fourth width-oriented sipe, and
the endpoint at the first circumferential direction side of the first width-oriented sipe is located on the second circumferential direction side of an endpoint at first circumferential direction side of the fourth width-oriented sipe.

10. The pneumatic tire according to claim 8, wherein
the third width-oriented sipe comprises a third sipe portion at which width is constant, and a third notch portion at which width increases outwardly in the tire radial direction,
a first end of the third sipe portion is contiguous with the second circumferential recessed region, and the third sipe portion is inclined with respect to the second circumferential recessed region, and the third notch portion is arranged at a corner at which the third sipe portion intersects the second circumferential recessed region to form an acute angle therebetween.

11. The pneumatic tire according to claim 10, wherein
the second notch portion and third notch portion are separated in the tire circumferential direction as viewed in the tire width direction, and
an endpoint at the first circumferential direction side of the third notch portion is located on the second circumferential direction side of an endpoint at the second circumferential direction side of the second notch portion.

12. The pneumatic tire according to claim 11, wherein the second sipe portion and the third sipe portion are respectively inclined so as to be directed in the same way with respect to the tire circumferential direction.

13. The pneumatic tire according to claim 12, further comprising a third circumferential recessed region extending in recessed fashion along the tire circumferential direction, and a fourth width-oriented sipe extending to intersect the tire circumferential direction, wherein
the first width-oriented sipe and the fourth width-oriented sipe straddle the third circumferential recessed region in the tire width direction;
the first width-oriented sipe and the fourth width-oriented sipe are arranged to have a portion thereof mutually overlapping as viewed in the tire width direction,
the endpoint at the first circumferential direction side of the first width-oriented sipe is located on the first circumferential direction side of an endpoint at the second circumferential direction side of the fourth width-oriented sipe, and
the endpoint at the first circumferential direction side of the first width-oriented sipe is located on the second circumferential direction side of an endpoint at the first circumferential direction side of the fourth width-oriented sipe.

14. The pneumatic tire according to claim 13, wherein
the fourth width-oriented sipe comprises a fourth sipe portion at which width is constant, and a fourth notch portion at which width increases outwardly in the tire radial direction,
a first end of the fourth sipe portion is contiguous with the third circumferential recessed region, and the fourth sipe portion is inclined with respect to the third circumferential recessed region, and
the fourth notch portion is arranged at a corner at which the fourth sipe portion intersects the third circumferential recessed region to form an acute angle therebetween.

15. The pneumatic tire according to claim 14, wherein
the first notch portion and fourth notch portion are separated in the tire circumferential direction as viewed in the tire width direction, and
an endpoint at the first circumferential direction side of the first notch portion is located on the second circumferential direction side of an endpoint at the second circumferential direction side of the fourth notch portion.

16. The pneumatic tire according to claim 15, wherein the first sipe portion and the fourth sipe portion are respectively inclined so as to be directed in the same way with respect to the tire circumferential direction.

17. The pneumatic tire according to claim 1, further comprising a third circumferential recessed region extending in recessed fashion along the tire circumferential direction, and a fourth width-oriented sipe extending in such fashion as to intersect the tire circumferential direction, wherein
the first width-oriented sipe and the fourth width-oriented sipe straddle the third circumferential recessed region in the tire width direction,
the first width-oriented sipe and the fourth width-oriented sipe are arranged to have a portion thereof mutually overlapping as viewed in the tire width direction,
the endpoint at the first circumferential direction side of the first width-oriented sipe is located on the first circumferential direction side of an endpoint at the second circumferential direction side of the fourth width-oriented sipe, and
the endpoint at the first circumferential direction side of the first width-oriented sipe is located on the second circumferential direction side of an endpoint at the first circumferential direction side of the fourth width-oriented sipe.

18. The pneumatic tire according to claim 17,
wherein the fourth width-oriented sipe comprises a fourth sipe portion at which width is constant, and a fourth notch portion at which width increases outwardly in the tire radial direction,
a first end of the fourth sipe portion is contiguous with the third circumferential recessed region, and the fourth sipe portion is inclined with respect to the third circumferential recessed region, and
the fourth notch portion is arranged at a corner at which the fourth sipe portion intersects the third circumferential recessed region to form an acute angle therebetween.

19. The pneumatic tire according to claim 18, wherein
the first notch portion and the fourth notch portion are separated in the tire circumferential direction as viewed in the tire width direction, and
an endpoint at the first circumferential direction side of the first notch portion is located on the second circumferential direction side of an endpoint at the second circumferential direction side of the fourth notch portion.

20. The pneumatic tire according to claim 19, wherein the first sipe portion and the fourth sipe portion are respectively inclined so as to be directed in the same way with respect to the tire circumferential direction.

* * * * *